United States Patent [19]

Greatorex

[11] Patent Number: 5,296,065
[45] Date of Patent: Mar. 22, 1994

[54] METHOD OF FORMING WORKPIECES BY MEANS OF MULTI-SECTIONAL PRESSING MEMBERS

[75] Inventor: Anthony T. Greatorex, Syston, United Kingdom

[73] Assignee: British United Shoe Machinery Limited, Belgrave, United Kingdom

[21] Appl. No.: 950,197

[22] Filed: Sep. 24, 1992

[30] Foreign Application Priority Data

Oct. 9, 1991 [GB] United Kingdom ............... 9121319

[51] Int. Cl.⁵ .............................................. B32B 31/20
[52] U.S. Cl. ..................................... 156/196; 156/221;
156/93; 156/228; 156/292; 156/296; 156/308.2;
156/309.6; 156/443; 156/583.1; 100/42; 100/93
P; 249/161; 264/258; 264/287; 264/324;
264/342 R; 425/393; 425/396
[58] Field of Search .............. 425/390, 393, 396;
264/257–258, 286–287, 324, 342 R, DIG. 42;
226/88; 156/196, 292, 210, 221, 93, 228, 311,
309.6, 308.2, 296, 443, 583.1; 428/116, 198;
100/38, 42, 92, 93 R, 93 P, 208, 226, 232, 141;
249/161, 162, 184, 144

[56] References Cited

U.S. PATENT DOCUMENTS

| | | | |
|---|---|---|---|
| 2,417,226 | 3/1947 | Weyant | 425/390 |
| 2,576,864 | 11/1951 | Valente | 55/DIG. 5 |
| 2,972,000 | 2/1961 | Boriolo | 264/324 |
| 3,462,330 | 8/1969 | Grieg et al. | 156/197 |
| 3,904,343 | 9/1975 | Scott, Jr. | 249/161 X |
| 5,030,305 | 7/1991 | Fell | 156/292 |
| 5,139,596 | 8/1992 | Fell | 156/292 |
| 5,200,013 | 4/1993 | Traber | 156/443 |
| 5,246,474 | 9/1993 | Greatorex | 55/381 |

FOREIGN PATENT DOCUMENTS 0429805  6/1991  European Pat. Off.
1607665  6/1970  Fed. Rep. of Germany Primary Examiner—Michael W. Ball
Assistant Examiner—Michele K. Yoder
Attorney, Agent, or Firm—Owen J. Meegan; Aubrey C. Brine

[57] ABSTRACT

A forming assembly comprises two presser members (22,24) each having a corrugated surface for receiving a workpiece made up of generally diamond-shaped pockets (10). Each presser member is made up of sections (22a,22b; 24a, 24b) mounted on slide rods (38) for movement between a spaced-apart position, in which a workpiece can be located therebetween, and a closed position, movement into which, while the workpiece is held between the presser members, is effective to compress the workpiece laterally. For holding the pockets in their diamond shape formers (20) are inserted therein. A flange (18) is formed at one end of the workpiece and integral therewith by pressing outwardly folded material against a lateral end face of the presser members (22,24) using a presser plate (52). This forming method is especially suitable for forming self-supporting filter units.

20 Claims, 5 Drawing Sheets

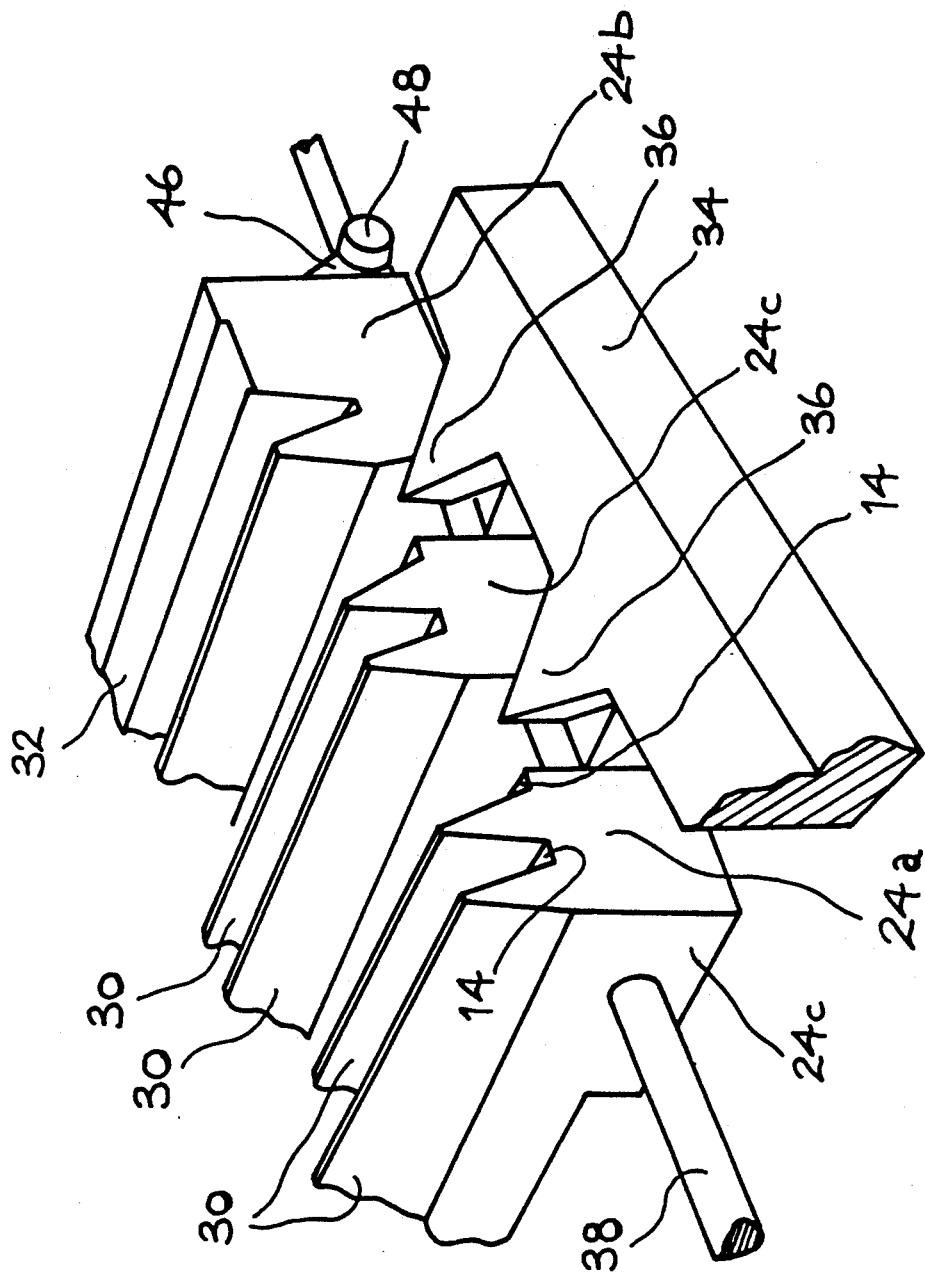

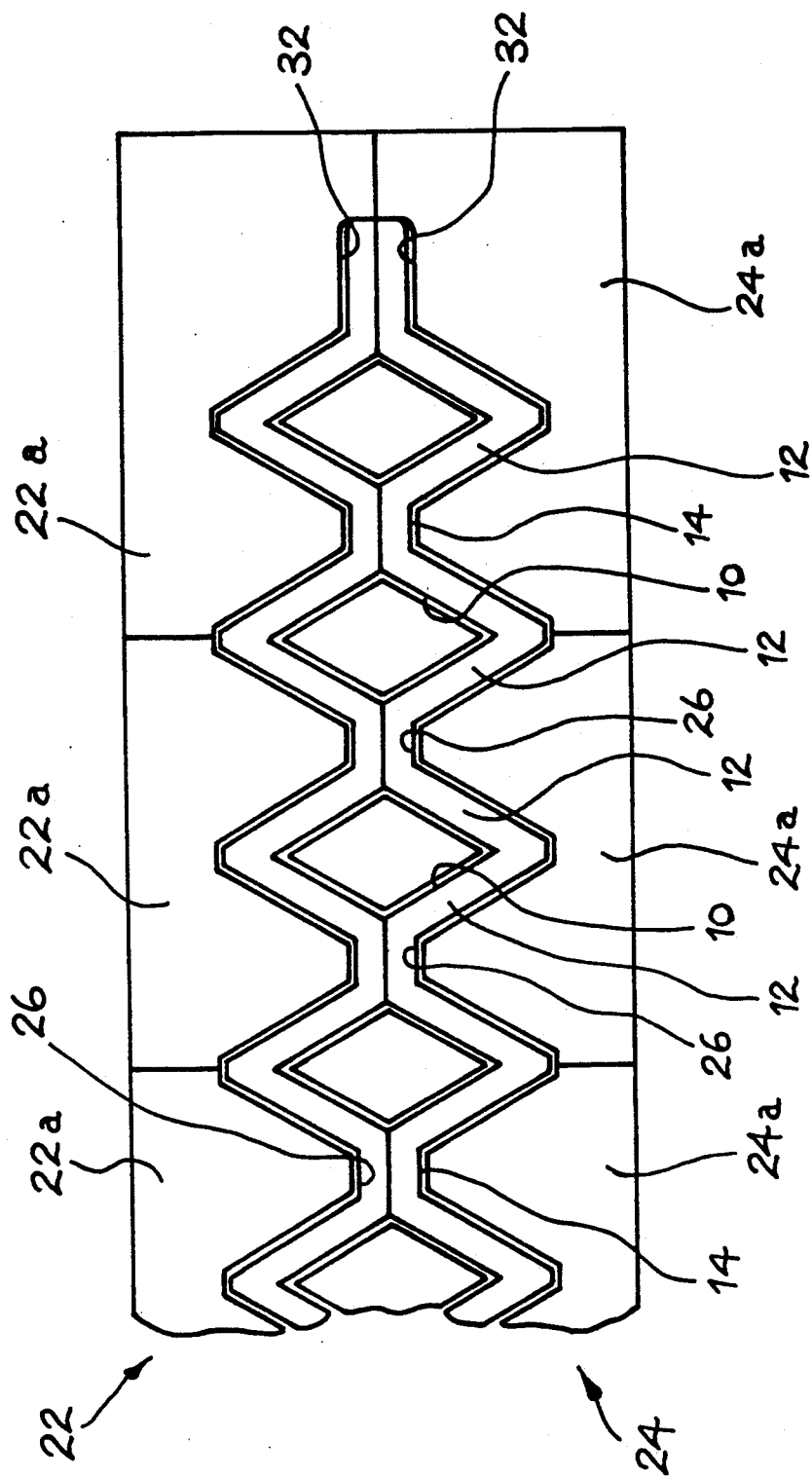

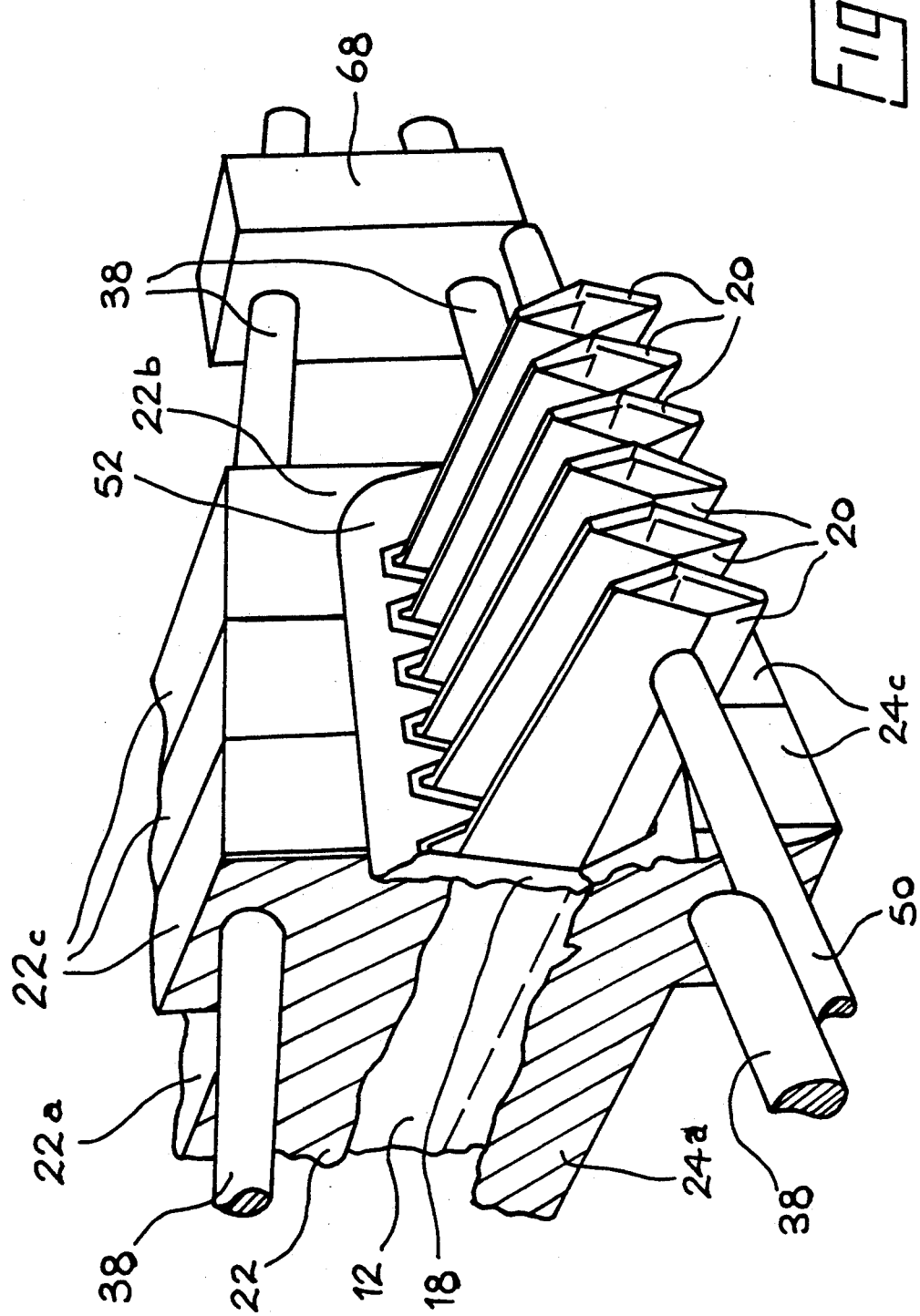

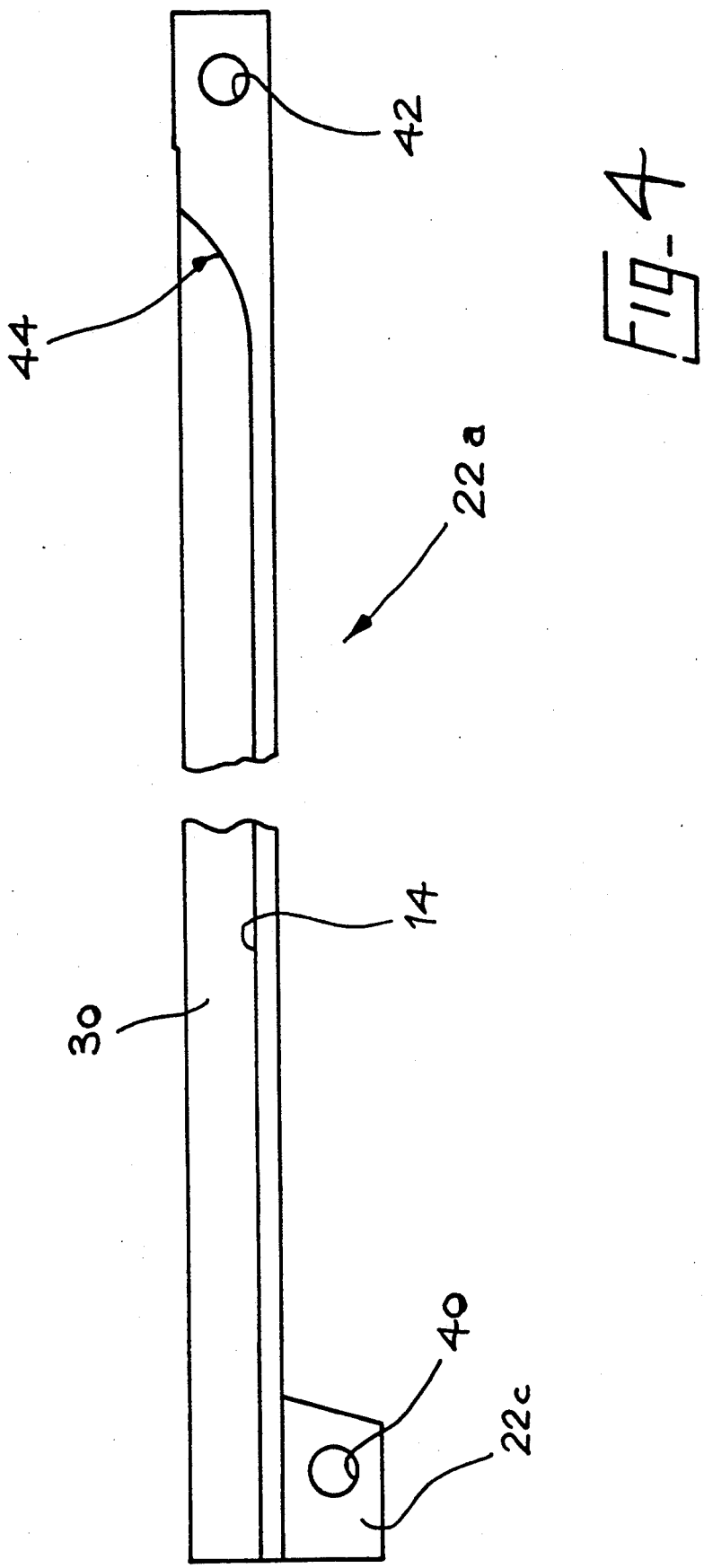

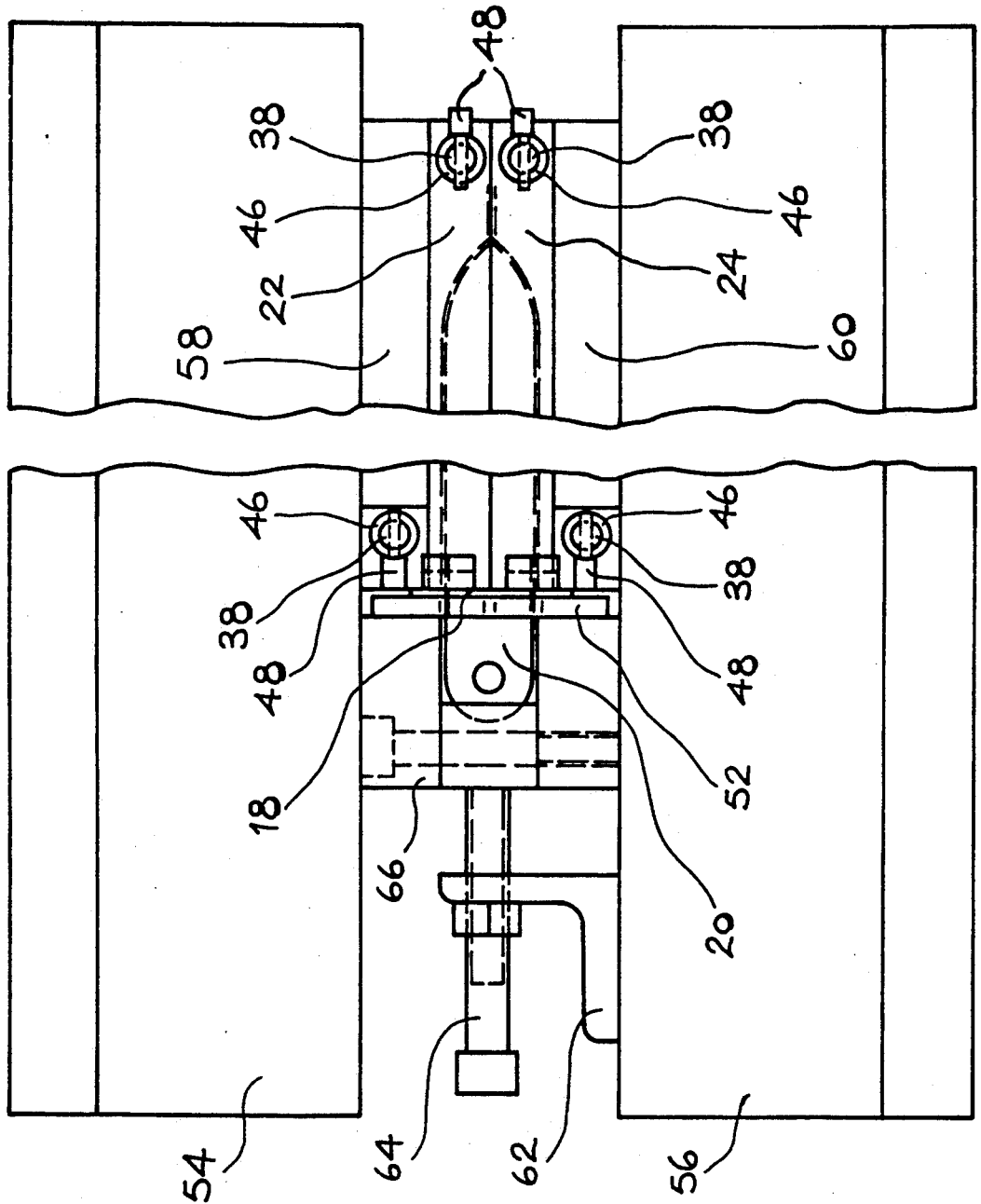

METHOD OF FORMING WORKPIECES BY MEANS OF MULTI-SECTIONAL PRESSING MEMBERS

BACKGROUND OF THE INVENTION

This invention is concerned with a method of forming a workpiece made up of two portions of material secured together to form pockets therebetween, and also with a forming assembly for use in carrying out such a method.

There is described in our co-pending U.S. patent application Ser. No. 07/872902 a method or process of forming a workpiece made up of two portions of material secured together to form pockets therebetween, said method comprising the steps of inserting formers into said pockets, each former having a cross-sectional shape to be imparted to the pocket in which it is accommodated, and thereafter placing the workpiece, with the formers thus accommodated in the pockets thereof, between two presser members having corrugated presser surfaces corresponding to the cross-sectional shape of the formers such that adjacent pockets of the workpieces each together with its former are accommodated in adjacent cooperating corrugations of each presser member, and then applying forming pressure to the presser members and thus to the workpiece retained therebetween.

The method is particularly suitable, but not exclusively so, for the manufacture of self-supporting filter units having a plurality of passages defined by air-permeable wall portions through which air to be filtered can pass and be drawn off along said passages, but which prevent the passage therethrough of dust and/or other debris carried by such air. To this end, in the forming process the presser members are heated to a sufficiently high temperature to cause the material of which the workpiece is made up to be rendered rigid, while retaining its air-permeability.

In using such a method as described in the aforementioned patent specification the presser members each comprise a continuous corrugated presser surface into which, therefore, the workpiece, with the formers accommodated in the pockets thereof, has first to be arranged. In practice, the operator places the workpiece on top of a first presser member and ensures that each corrugation accommodates its own pocket with accommodated former, whereafter the other presser member is brought into surface contact from above and the workpiece is thus held between the presser members. In most cases, however, there is more "bulk" in the workpiece before forming than after, due to the application of heat and pressure in the forming operation. Thus, the loading of the unformed workpiece onto the lower presser member and maintaining it in position thereon while the other presser member is brought into surface contact therewith is time-consuming and tedious and may lead to unreliable location.

OBJECT OF THE INVENTION

It is thus an object of the present invention to provide an improved method of forming a workpiece wherein the loading, prior to forming, of a workpiece between the presser members is facilitated.

It is another of the various objects of the present invention to provide an improved forming assembly in the use of which the loading of a workpiece is facilitated.

SUMMARY OF THE INVENTION

The first of these objects is resolved in accordance with the method as set out in the first paragraph above, in that each presser member is made up of a plurality of sections, each comprising at least one corrugation, said sections being supported on a support arrangement for movement between a spaced-apart position and a closed position, in that the workpiece, with the formers accommodated in pockets thereof, is brought into surface contact with the corrugated surfaces provided by the presser members while the sections of each thereof are in their spaced-apart position, the workpiece thus being held between the corrugated surfaces, and in that the method further comprises the steps of then closing the sections together whereby the workpiece held as aforesaid is compressed laterally, and thereafter applying forming pressure to the presser members, and thus to the workpiece held in its laterally compressed condition therebetween.

It will thus be appreciated that, in a relatively simple manner, the loading of a workpiece is now significantly facilitated, the workpiece being allowed to assume its normal configuration for loading, whereafter, prior to forming, it is then compressed laterally into a condition for forming.

In one embodiment of the invention the corrugated surfaces of the presser members may be held in opposed relationship to allow the workpiece, with the formers accommodated in the pockets thereof, to be inserted therebetween. Alternatively the workpiece may first be placed in surface contact with one of the presser members, while the other is in a remote position, whereafter said other member is then brought into surface contact with the thus located workpiece.

If desired, for receiving the workpiece in the corrugations the sections of each presser member are moved apart and maintained thus spaced apart by means of one or more spacer members, said spacer members being withdrawn after the surface of said other presser member has been brought into surface contact with the workpiece, thus to enable the sections to be closed together. Such an arrangement is particularly useful, it will be appreciated, if the loading process is to be automated.

In order to ensure that no relative movement takes place between the sections of the presser members during the forming operation, furthermore, preferably the sections of each presser member are clamped in their closed condition during the application of forming pressure as aforesaid.

As in the case of the aforementioned U.S. Patent Application, in carrying out the forming operation preferably marginal portions of the portions of material along one edge of the latter project outwardly from the presser members when closed as aforesaid, said marginal portions being not secured to one another. Moreover, in such case, said marginal portions are flanged outwardly and pressed against a presser surface provided by or associated with the lateral surface of the presser members, thus to form an integral flange, into which the pockets open, at one edge of the workpiece. For pressing the outwardly flanged marginal portions aforesaid, furthermore, conveniently a presser plate is used having an aperture or apertures formed therein to enable said plate to be moved along an end portion of each former into engagement with the outflanged marginal portions. The flange pressing operation preferably takes place at the same time as the forming operation itself.

Conveniently forming pressure is applied by two cooperating platens of a press, between which the presser members, clamped closed together and with a workpiece held therebetween as aforesaid, are disposed. When operating on materials which are rendered rigid by heat and pressure, furthermore, preferably the presser members are made of a material having good thermal conductivity and the platens of the press are heated.

The second of the above objects is resolved in accordance with the invention by a forming assembly comprising two opposed presser members having corrugated presser surfaces between which a workpiece made up of two portions of material secured together so as to form pockets therebetween, in which pockets formers having a cross-sectional shape corresponding to and capable of cooperating with the corrugated presser members are accommodated, can be pressed and thus be formed to the shape of the formers and presser members, wherein each corrugated presser member is made up of a plurality of sections, each comprising at least one corrugation, said sections being supported on a support arrangement for movement between a spaced-apart position and a closed position, in which spaced-apart position a workpiece having formers accommodated in pockets thereof can be located between and in surface contact with the corrugated surfaces provided by the corrugations of the sections of the presser members, the pockets accommodating the formers being received in the corrugations, and the workpiece thus being held between the two presser members, and in their closed position the sections of each presser member form a continuous corrugated surface, the arrangement being such that, with the workpiece held between the presser members, movement of the sections to their closed position is effective to compress the workpiece laterally.

For optimum ease of loading, each of said section preferably comprises only a single corrugation, that is to say has two "peaks", between which one "land" is located and also having one further "land" adjacent one of the "peaks", the arrangement being such that when the sections are in their closed position said further land lies adjacent a "peak" of the next section. In this way, the loading of the workpiece in its normal condition is thus facilitated without any need for lateral compression at any part along its length.

In using such a forming assembly for an outflanging operation as referred to above, furthermore, conveniently at at least one end the presser members are configured to provide openings from which the material portions of the workpiece held between the presser members can project, the lateral surfaces provided by the presser members at said one end constituting or having associated therewith a presser surface, and the assembly further comprising a presser plate, which is provided with an aperture or apertures corresponding to the openings provided by the presser members, and between which and said presser surface said portions of the workpiece projecting from said openings and outwardly flanged can be pressed. Moreover, preferably abutment means is provided at or adjacent said end of the presser members, which abutment means serves for the application of i counter-pressure when the presser plate is pressed against the presser surface as aforesaid. Where forming pressure is applied by two cooperating platens of a press, as referred to above, furthermore, conveniently the abutment means comprises two abutments, one arranged on each of the platens of the press.

In a preferred embodiment the support arrangement comprises a plurality of slide rods along which the sections are mounted for sliding movement, together with positioning means for holding the rods associated with one of the presser members and those associated with the other of the presser members in a predetermined relationship in which a workpiece is held between the presser members such that the sections of said members can be moved from the spaced-apart to their closed positions without losing registration between the workpiece and the corrugations. Conveniently, furthermore, the positioning means is movable to an out-of-the-way position following the clamping of the sections by the clamping means as aforesaid, thereby allowing forming pressure to be applied to the presser members, and thus to the workpiece therebetween.

BRIEF DESCRIPTION OF THE DRAWINGS

There now follows a detailed description, to be read with reference to the accompanying drawings, of a method of forming a workpiece, more particularly a filter unit, and a forming assembly for use in carrying out such method. It will of course be appreciated that this method and this assembly have been selected for description merely by way of exemplification of the invention and not by way of limitation thereof.

In the accompanying drawings:

FIG. 1 is a fragmentary perspective view of one presser member of a forming assembly in accordance with the invention, showing sections thereof in a spaced-apart position, together with spacer means for determining such position;

FIG. 2 is a fragmentary sectional view showing two presser members, with the sections thereof in a closed position and holding therebetween a workpiece in pockets of which formers are accommodated.

FIG. 3 is a fragmentary perspective view showing the sections of the presser members in their closed position and with a presser plate in position for performing an outflanging operation on end portions of the workpiece projecting from the presser members; and FIG. 4 is a view in side elevation of one section; and FIG. 5 is a view in side elevation showing a platen press modified for use with the forming assembly in accordance with the invention.

DESCRIPTION OF THE PREFERRED EMBODIMENTS

The method now to be described is especially suitable, but not exclusively go, for use in the manufacture of filter units of the type comprising a plurality of passages 10 (FIG. 2) defined by air-permeable wall portions 12 through which air to be filtered can pass and be drawn off along said passages but which prevent the passage therethrough of dust and/or other debris carried by such air. The wall portions 12 each define a generally diamond shape and said shapes are joined together by intermediate lands 14 which are secured e.g. by rows of stitches, or are subsequently to be secured, together. Each passage 10 is closed at one end but open at the other; each passage thus forms a pocket, to be referred to hereinafter. Along the edge of the filter unit adjacent to the open end of the passages, furthermore, a flange 18 (FIG. 3) is formed integral with the wall portions 12. If desired, moreover, said flange may be laminated with a reinforcing layer of generally the same outline as the flange, said reinforcing layer having formed therein apertures which are lined with the open ends of the passages 10. The flange serves to provide a mounting for the filter unit in a suitable filter assembly.

The workpiece from which such a filter unit is to be produced conveniently comprises two portions of a suitable fibre fabric laid in face-to-face contact, the portions then being secured together e.g. by rows of double stitches. Where stitching is used in this manner, the passages 10 may be closed at one end by stitching at said one end along e.g. an arcuate path such that the stitches from one pair or rows join up with the stitches from the adjacent pair of rows. Moreover, at the opposite end the rows of parallel stitches stop short of the edge of the fabric which, as will be referred to later, can then be folded outwardly to form the flange 18.

In carrying out the method in accordance with the present invention, with the fabric portions secured together as aforesaid, formers 20 are first inserted one into each pocket of the workpiece. Each former 20 has a generally diamond-shaped cross-section and thus the wall portions 12 defining each passage are shaped to a corresponding diamond shape. The fabric, with the formers thus inserted and the passages thus shaped, is placed between two presser members, 22,24 which have mating corrugated surfaces, the arrangement being such that with the corrugations arranged peak-to-peak the "valleys" correspond in shape to the shape of the formers 20 and are spaced so as to each receive a former, with the material held thereon being accommodated in the valley. Between the valleys, moreover, are formed lands 26 which are generally flat and which correspond to, and impart the desired shape to, the regions of the fibre fabric which have been stitched, thus to form corresponding lands in the finished filter unit. The rows of stitches are preferably arranged such that the stitches are formed in the corners defining the edges of such lands.

It will be noted from the right-hand side of FIG. 2 that the edge of the filter is clamped between two flat plate portions 32 of the presser members 22,24. These have the function of holding the edge of the material firmly as well as for the application of heat and pressure to the material of which the filter unit is to be made.

The forming assembly for use in carrying out the aforementioned method comprises, as already mentioned, the formers 20 and two presser members 22,24. As can be seen from in particular FIGS. 1 to 3, furthermore, each presser member 22 (or 24) is made up of a number of sections 22a, 22b (or 24a, 24b). Each section comprises a single corrugation, i.e. two "peaks" 30 between which is located a land 14 and outside the "peaks", at one side thereof, a further land 14, the arrangement being such that when the sections are in a closed position (as shown e.g. in FIGS. 2 and 3), the further land 14 is located between the one peak 30 and the adjacent peak of the next section. As can be seen from FIGS. 1 and 2, furthermore, the end sections (one only shown in said Figures) are provided with the generally flat plate portions, but recessed at 32 to receive the edges of the portions of the workpiece. By providing sections in this manner, it is possible now for the operator to load a workpiece, in the pockets of which formers 20 have been inserted, with the sections in a spaced-apart position (as shown in FIG. 1) which corresponds to the normal state of the workpiece before it is formed. In general the material before forming will be "fluffier" and less dense and consequently the spacing between adjacent formers is greater than when the material has been formed and is thus more dense. For spacing the sections in their spaced-apart position, furthermore, a simple spacer device 34 in the form of a "comb" may be provided at opposite ends of each of the presser members (one only shown in FIG. 1), said device having projections 36 which are inserted between adjacent sections to space them at the appropriate distance. The spacer device 34 may be moved manually into position, or suitable motor means, e.g. a pneumatic cylinder, may be provided for this purpose.

The shape of each section is illustrated, in side elevation, in FIG. 4, from which it can be seen that at opposite ends of each section are provided two bores 40,42 for receiving slide rods 38 (see FIG. 5) on which the sections can be slid between their spaced-apart and closed positions. It will be observed that the bore 40 is arranged in a block 22c (or 24c) secured to the top (or underside) of the section in order to "clear" the corrugated portions of each section. At its opposite end (as shown in FIG. 4), the section is solid, the "valley" between the two peaks 30 terminating in a slope, as indicated at 44. It will of course be appreciated that the closed end of a pocket of the workpiece will be located at or near the slope 44.

The sections 22a, 22b, 24a, 24b are mounted thus for sliding movement on the slide rods 38 between their spaced-apart position and their closed position. The closed position, moreover, is determined by stop members 46 carried on the rods and located thereon by pins 48. The sections are thus moved together, in a direction towards the stop members 46, and are held clamped thereagainst. In a simple form of clamping the rods may each comprise, at a distance from the stop members 46 which is substantially the length of the presser members when in their closed position, a threaded portion on which a clamp nut can be screwed up against the end surface of the presser member. Alternatively, it will be appreciated, any suitable pneumatic clamping device may be provided.

As will be seen from FIG. 3, a further rod 50 passes through bores in end portions of the formers 20 for the purpose of retracting the formers at the end of a forming operation.

As already mentioned above, during the forming operation a flange 18 is formed at one end of the workpiece, the pockets 10 opening into said flange. For providing this flange, the portions of the workpiece at said end are not secured together. Thus, with said end portions projecting from the presser members, they can be folded outwards, the flange then being formed by the application of heat and pressure to the outwardly flanged portion. For applying such pressure firstly the lateral surfaces of the sections 22a, 22b, 24a, 24b constitute a presser surface against which the outwardly flanged portion 18 can be pressed by a presser plate 52 (FIGS. 3 and 5). The plate 52 has cut-outs to allow it to be slid along the projecting ends of the formers 20 (prior to the insertion of the rod 50), as can be seen from FIG. 3. Any suitable means may be provided for pressing the presser plate 52 against the presser surface. In the assembly shown in FIG. 5, the flange pressing operation takes place contemporaneously with the forming operation in a platen press comprising upper and lower press platens 54,56. Each platen is provided with a presser block 58,60 respectively between which the portions of the sections outside the blocks 22c, 24c are pressed and against end faces of which the rear faces of said blocks 22c, 24c respectively abut, the depth of the abutments 58,60 being the same as the depths of the blocks 22c, 24c. Also supported on the lower platen 56 by means of a bracket 62 is a threaded adjustable pressure shaft 64 which carries at its right-hand end (viewing FIG. 5) a generally U-shaped press block 66 by which pressure is applied to the presser plate 52. Thus, by turning the shaft 64, pressure is applied to the presser member 52, the end faces of the presser blocks 58,60 thus providing a counter-pressure. In an alternative arrangement any suitable pneumatic means may be provided for this purpose.

Using the forming assembly in accordance with the invention in a forming press as above described, the operator firstly ensures that the sections 24a, 24b of the lower presser member 24 are moved, by the spacer means 34, to their spaced-apart position and inserts the formers 20 into the pockets of a workpiece to be formed. The operator then locates the workpiece between the corrugations of the surfaces of the presser members, more particularly by first placing the workpiece on the corrugations provided by the sections 24a, 24b of the lower presser member, one pocket accommodating a former being located in each "valley" of the corrugated surface. When the workpiece is thus properly located the upper presser member 22, with its sections 22a, 22b also in the spaced-apart condition, as determined by spacer means 34 associated therewith, is brought from an out-of-the-way position into surface contact with the upper surface of the workpiece. At this stage, furthermore, the two presser members 22,24 are positioned in relation to one another by positioning means in the form of blocks 68 (one only shown in FIG. 3), in bores of which end portions of the slide rods 38 are accommodated. The blocks so position the presser members 22,24 in relation to one another that the workpiece is held firmly but not under any forming pressure. In this position the sections are then moved from their spaced-apart position into their closed position, the workpiece thus being compressed laterally into the condition as shown in FIG. 3. With the workpiece thus held, the presser plate 52 is then slid across the projecting ends of the formers 20 (again as shown in FIG. 3), the operator ensuring that the flange portion 18 is smoothly spread over the presser surface provided by the lateral wall surfaces of the sections of the presser members. Prior to thus sliding the presser plate 52 over the formers, furthermore, if desired a further separate portion of material may be positioned against the flange portion, which further portion has cut-outs corresponding to the ends of the passages 10. Such further portion is bonded to the flange portion during the forming operation and constitutes a reinforcing portion. This further portion may be of the same material as the flange portion or may be different; in addition according to whether or not it is self-adhesive, it may be provided with a layer of adhesive, e.g. heat-activatable adhesive.

The forming assembly is then placed in the platen press, with the rear surfaces of the blocks 24c of the sections of the lower presser member 24 abutting against end faces of the abutment block 60 on the lower platen 56 of the press. The upper platen 54 of the press is then lowered under low pressure to hold the forming assembly in position, whereafter the positioning blocks 68 may be removed from the slide rods 38 in order to enable forming pressure thereafter to be applied by the platen press and during such forming operation flange-pressing pressure is also applied to the flange 18 via the presser plate 52 as described above.

At the end of the forming and flange pressing operation, the rod 50 can be inserted through the formers 20 and, after the workpiece has been released from the forming assembly, the formers can be removed in a single operation.

Where the material of the workpiece is of a type rendered rigid by heat and it is desired so to render it rigid, the press platens 54,56 are heated to an appropriate temperature, as will be referred to hereinafter, the thermal conductivity of the sections of the presser members being such that the heat is rapidly transferred to the sections and therefore applied during the forming operation to the workpiece. Where heat is thus applied, moreover, desirably the forming assembly is subjected to a cooling operation prior to removal of the workpiece, and under such circumstances it may be preferable, from the point of view of productivity, for two or three forming assemblies to be used in combination with a single platen press.

The type of fabric used in carrying out the method in accordance with the invention is prepared by known non-woven felt manufacturing techniques, including a needle punching operation. Moreover, as already mentioned, preferably the fibres used in the production of the fabric are such that the fabric can be rendered rigid, while retaining its air-permeability, by the application thereto of heat and pressure, the fibres of the fabric being thus caused to shrink (the degree of shrinkage being of course dependent upon the nature of the fibres themselves) and the fibres thus being consolidated to form a rigid self-supporting structure; this is of particular value in the manufacture of self-supporting filter units. To this end, the fibres used may be of a type which, upon being heated to temperatures above their glass transition temperature, are rigidised, whether in conjunction with significant shrinkage or otherwise. Alternatively the fibres may be thermoplastic fibres which, upon being heated to a temperature below but near to the melt temperature of the thermoplastic material, flow and become bonded at random areas, but without detriment to the air-permeability of the finished material. Again, the fibres may be of two distinct materials with different characteristics, especially melt characteristics, and in this case by melting the fibres having the lower melt temperature while leaving the other fibres unmelted, bonding of the fibres together can be achieved, together with a stiffening effect, but again without detriment to the air-permeability of the finished fabric. Of particular benefit in such a case, moreover, the use of bi-component fibres may be contemplated. As a still further alternative, moreover, multi-layer fabrics may be used, the separate layers of which exhibit different features all of which are desirable in a rigid self-supporting filter unit.

The choice of fibre fabric to be used depends to a large extent upon the use to which the filter units are to be put. For example, in certain cases it is desirable that they be resistant to chemical corrosion and/or that they can operate at relatively high operating temperatures, e.g. up to 200° C. or more, whereas in other cases where chemicals are not likely to present a problem and where the operating temperatures are low, e.g. ambient temperature, quite different materials may be used.

There now follows a number of Examples of different materials which have been found suitable for use in carrying out the method in accordance with the invention.

EXAMPLE 1

A non-woven fibre felt was produced using a blend of 50% by weight 1.7 decitex/60 mm and 50% by weight 3.3 decitex/60 mm staple polyimide fibres supplied under the designation P84 by Lenzing AG. The weight of the flexible fibre felt produced by the needle punching operation was about 400 grammes/square meter and the gauge was about 3.5 mm. These polyimide fibres are suitable for use in filter assemblies operating at temperatures up to about 200° C. These fibres moreover are very suitable for use in conditions where chemicals are present and also they are not soluble in any known solvent.

Two portions of the felt thus produced were laid in face-to-face contact and stitched as described above to form pockets therein open at one end and formers 20 were then inserted into each of the pockets, all as described above. The formers 20 thus carrying the formed portions of the felt were then arranged between the corrugated presser members 22,24, which were then closed and the presser members were heated to a temperature somewhat in excess of the glass transition temperature of the P84 fibres, namely 315° C. At the same time, a pressure in the order of 0.525 MPa was applied between the press platens. The effect of thus heating the fibre fabric was firstly to cause significant shrinkage to take place, which was however constrained by the pressure applied between the presser members 22,24 so that the risk of the fabric tearing, especially in the region of the stitches 16, was minimised. At the same time, the P84 fibres changed their condition to a rigid, crystalline, state, and in this way a rigid self-supporting filter unit produced. The surface provided on the filter unit manufactured using the above method was smooth. For enhanced filtration and improved release of dust from the surface, however, a micro-porous coating of P.T.F.E.-based film was applied to said surface after manufacture.

The filter units made using this material were resistant to all usual organic solvents and showed excellent resistance to acid and many alkalis. They were furthermore capable of operating at continuous temperatures of up to 260° C. and maximum temperatures of up to 300° C.

Instead of a blend of P84 fibres of different decitex, furthermore, good results have also been obtained using P84 fibres of 2.2 decitex and 60 mm length.

EXAMPLE 2

A non-woven fibre felt was produced using polyphenylene sulphide resin fibres of 3.3 decitex and 50 mm length, such fibres being supplied under the designation Ryton PPS fibres by Phillips Fibers Corporation. The weight and gauge of the flexible fibre felt produced were generally similar to that of Example 1, and the fibres were suitable for use in filter assemblies operating at continuous temperatures of up to about 180° C. These fibres moreover are very suitable for use in conditions where chemicals are present. Using a similar method to that disclosed in Example 1, two portions of the felt were laid in face-to-face contact and stitched and formers inserted into the pockets thus produced, prior to insertion of this assembly between the corrugated presser members. In this case the presser members were heated to a temperature in excess of 260° C., but below the melt temperature of the fibres, which in this case was 285° C. The effect of thus heating the fibre fabric was firstly to cause significant shrinkage to take place, which was however constrained by the pressure applied between the presser members, and at the same time the softening of the fibres allowed the fibres to become bonded together, while retaining the air-permeability of the material, and in this way, together with the relatively high applied pressure, a well-defined rigid filter unit was produced. After the unit had been thus manufactured, a micro-porous coating of a P.T.F.E-based film was applied to the outer surface thereof in order to achieve enhanced filtration and improved dust release.

The filter units made using this material were resistant to all usual organic solvents and showed excellent resistance to acid and many alkalis. They were furthermore capable of operating at continuous temperatures of up to 180° C. and maximum temperatures of 230° C.

EXAMPLE 3

In this Example the same method was carried out as in Example 2, except that the fibres in this case were a blend of 50% by weight 1.5 decitex/50 mm and 50% by weight 3.0 decitex/50 mm staple polyester fibre. Moreover, the temperature of the presser members during the forming operation was closely controlled and the fibres were heated to a temperature just below their melt point; the melt temperature of the polyester fibres used was 240° C., and the maximum temperature to which the fibre fabric was heated was thus 230° C. By so heating the fibre fabric a 9% shrinkage was achieved and this shrinkage, together with the pressure applied and the softening of the fibres to cause them to bond together, produced a well-defined filter unit. Again, a microporous coating of a P.T.F.E.-based film was applied to the outer surface after manufacture. (In some applications it may be found that this coating may be dispensed with.)

EXAMPLE 4

In this case a fibre fabric was used comprising a blend of polyester fibres and polypropylene fibres in a ration of 70:30 parts by weight. The polyester fibres were of 1.5 decitex and 50 mm in length and the polypropylene fibres 2.8 decitex and 50 mm in length. The melt temperature of the polyester fibres was 240° C. and that of the polypropylene 165° C.

As in the previous Examples two portions of the material were laid in face-to-face contact and stitched as previously described, the formers were inserted and the assembly placed between the corrugated press members. In this case the presser members were heated to above the melt temperature of the polypropylene, thus causing the polypropylene to melt and flow, thereby bonding the polyester fibres together, while nevertheless maintaining the air-permeability of the fabric as a whole. In addition, the heat imparted caused shrinkage of the polypropylene fibres and to some lesser degree of the polyester fibres and that shrinkage, together with the application of pressure, produced a well-defined filter unit of relatively rigid material. As in the case of Example 3, the surface of the finished unit may be coated with a micro-porous coating of the P.T.F.E-based film.

Filter units made of this material are of course capable of operating at lower temperatures than the first two examples, and in general would be suitable for use up to operating temperatures of 100° C.

EXAMPLE 5

In this Example a fibre felt was produced using a bi-component fibre, more particularly a bi-component fibre of the concentric type having a core of a higher melting point and sheath of a lower melting point. In the particular Example a bi-component fibre identified as T252 supplied by Hoechst was used, having a decitex of 3.0 and a 50 mm length, the melt temperature of the sheath component being in the order of 110° C.

As in the previous Example, the bi-component fibre fabric was heated, after stitching and insertion of formers, to a temperature somewhat in excess of the melt temperature of the sheath component, thus causing it to melt and flow and thus bond the core fibres together. Again, moreover, a well-defined self-supporting filter unit of rigid material was produced. Again, furthermore, as in the two previous cases, a micro-porous coating of a P.T.F.E.-based film may, if desired, be applied to the outer surface of the unit thus produced.

Filter units made using this material were capable of operating at ambient temperatures and indeed at temperatures up to 80° C.

Whereas in this Example it has been proposed to use 100% bi-component fibres for the production of the fibre fabric in question, according to the particular requirements and also bearing in mind that such bi-component fibres tend to be expensive, other fibre fabrics may be used in carrying out the method in accordance with the invention wherein the bi-component fabric content is from 5 to 100% by weight.

Whereas in the foregoing Examples the fabric has been prepared by a needle punching operation, it will be appreciated that fabrics made using other non-woven techniques may be employed, e.g. hydro-entangled, stitch-bonded or wet-laid fabrics, and indeed fabrics other than non-woven fabrics may also be used, e.g. knitted and woven fabrics.

I claim:

1. A method of forming a workpiece made up of two portions of material secured together to form pockets therebetween, comprising the steps of
    inserting formers into said pockets, each former having a cross-sectional shape to be imparted to the pocket in which it is accommodated, and
    thereafter placing the workpiece, with the formers thus accommodated in the pockets thereof, between two presser members having corrugated presser surfaces corresponding to the cross-sectional shape of the formers such that adjacent pockets of the workpiece each together with the former are accommodated in adjacent cooperating corrugations of each presser member,
    wherein each presser member is made up of a plurality of sections, each section comprising at least one corrugation, said sections being supported on a support arrangement for movement between a spaced-apart position and a closed position,
    and wherein the workpiece, with the formers accommodated in pockets thereof, is brought into surface contact with the corrugated surfaces provided by the presser members while the sections of each thereof are in their spacedapart position, the workpiece thus being held between the corrugated surfaces,
    the method further comprising the steps of
    then closing the sections together whereby the workpiece held as aforesaid is compressed laterally,
    and thereafter applying forming pressure to the presser members, and thus to the workpiece held in its laterally compressed condition therebetween.

2. A method according to claim 1 wherein the workpiece is first placed in surface contact with one of the presser members while the other is in a remote position, and thereafter said other member is then brought into surface contact with the thus located workpiece.

3. A method according to claim 1 wherein for receiving the workpiece in the corrugations the sections of each presser member are moved apart and maintained thus spaced apart by means of one or more spacer members, said spacer members being withdrawn after the surface of said other presser member has been brought into surface contact with the workpiece, thus to enable the sections to be closed together.

4. A method according to claim 1 wherein the sections of each presser member are clamped in their closed condition during the application of forming pressure as aforesaid.

5. A method according to claim 1 wherein each section comprises two elongated projections, each of generally triangular cross-section, constituting "peaks" of the corrugated surface of the presser member of which the section forms part.

6. A method according to claim 1 wherein marginal portions of the portions of material along one edge of the latter project outwardly from the presser members when closed as aforesaid, said marginal portions being not secured to one another,
    and wherein said marginal portions are flanged outwardly and pressed against a presser surface provided by or associated with the lateral surface of the presser members, thus to form an integral flange, into which the pockets open, at one edge of the workpiece.

7. A method according to claim 6 wherein for pressing the outwardly flanged marginal portions as aforesaid a presser plate is used having an aperture or apertures formed therein to enable said plate to be moved along an end portion of each former into engagement with the outflanged marginal portions.

8. A method according to claim 7 wherein, prior to the application of pressure by the presser plate, a further portion of material is placed over the outflanged portions for reinforcing them, said further portion having an aperture or apertures formed therein corresponding to the open ends of the pockets, said further portion being secured to the outflanged portions during the application of pressure.

9. A method according to claim 7 wherein abutment means is provided against which a lateral surface portion of the presser members abuts and which provides a counter to the pressure applied by the presser plate as aforesaid.

10. A method according to claim 9 wherein the end section of each presser member beyond which the unsecured portions of the portions of material project has a projection on its surface opposite the corrugated surface thereof, which projection provides the lateral surface abutting against the abutment means.

11. A method according to claim 4 wherein forming pressure is applied by two cooperating platens of a press, between which the presser members clamped closed together and with a workpiece held therebetween as aforesaid, are disposed.

12. A method according to claim 9 wherein forming pressure is applied by two cooperating platens of a press, between which the presser members clamped closed together and with a workpiece held therebetween as aforesaid, are disposed and, wherein the abutment means comprises two abutments, one arranged on each platen of the press.

13. A method according to claim 11 wherein the material providing said two portions is rendered rigid by the application of heat, and wherein the presser members are made of a material having good thermal conductivity and the platens of the press are heated.

14. A method according to claim 1 wherein the material providing the two portions is a non-woven fabric which is flexible and air-permeable and which is rendered rigid when heated to temperatures in excess of 315° C.

15. A method according to claim 14 wherein said material is made from polyamide fibres.

16. A method according to claim 1 wherein the material providing the two portions is a non-woven fabric which is flexible and air-permeable and which is rendered rigid when heated to temperatures in excess of 260° C.

17. A method according to claim 16 wherein said material is made from polyphenylene sulphide fibres.

18. A method according to claim 1 wherein the material providing the two portions is a non-woven fabric made of polyester fibres having a melting point in the order of 240° C.

19. A method according to claim 1 wherein the material providing the two portions is a non-woven fabric which is flexible and air-permeable and which is made from polyester fibres and polypropylene fibres in amounts ranging respectively from 55 to 80 and 45 to 20 parts by weight, in which fabric, when heated above the melting point of the polypropylene fibres, said fibres melt and flow to bond the polyester fibres together and thus render the fabric rigid.

20. A method according to claim 1 wherein the material providing the two portions is a non-woven fabric which is flexible and air-permeable and which comprises at least 5% by weight of bi-component fibres one component of which has a melting point in the order of 110° C., in which fabric, when heated above said melting point, said one component melts and flows to bond the remaining fibres together and thus render the fabric rigid.

* * * * *